Nov. 20, 1928.

F. BRERO 1,692,327

ELECTRIC UPSETTING OR JOLTING MACHINE

Filed Oct. 25, 1926

Inventor
Francesco Brero
by Henry Orth
Atty

Patented Nov. 20, 1928.

1,692,327

UNITED STATES PATENT OFFICE.

FRANCESCO BRERO, OF TURIN, ITALY.

ELECTRIC UPSETTING OR JOLTING MACHINE.

Application filed October 25, 1926, Serial No. 144,090, and in Italy November 6, 1925.

This invention relates to an upsetting or jolting machine wherein the work piece is heated by electricity. The machine consists of a clamp gripping the work piece and forming the contact for one of the poles of a source of electricity while another device pushes the work piece against a stop connected to the other electrode. The work piece is thus heated in the zone comprised between the gripping device and the stop and is upset under the action of pressure. The pressure for closing the clamping device and for advancing the work piece is conveniently generated by means of a hydraulic arrangement by which it is possible to adjust exactly the maximum stress and therefore to effect jolting exactly at the desired temperature, i. e. at a lower temperature with higher pressure and vice versa.
The accompanying drawing shows by way of example a constructional form of the machine according to the invention.

Figure 1:
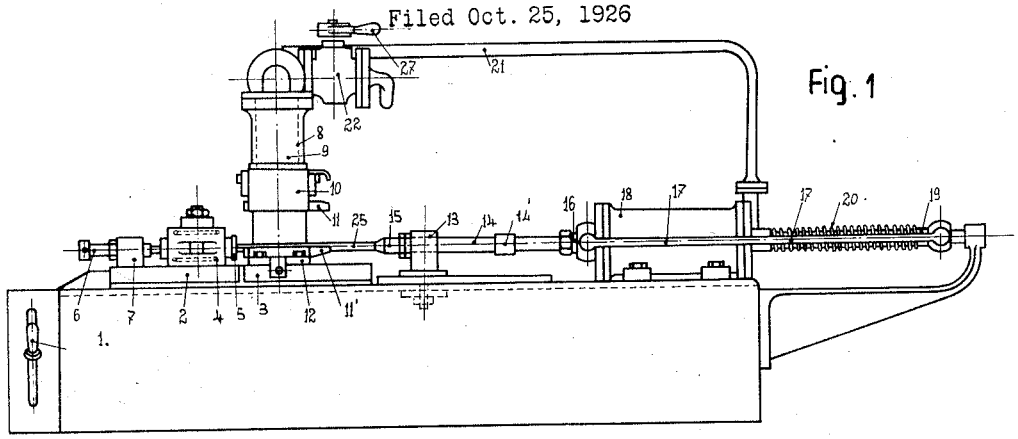
Figure 1 is a side view.
Figure 2:
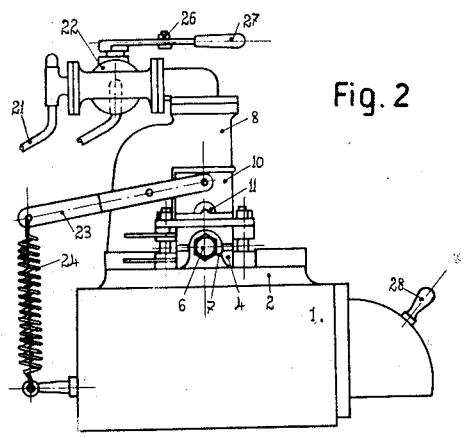
Figure 2 is a front view.
Figure 3:
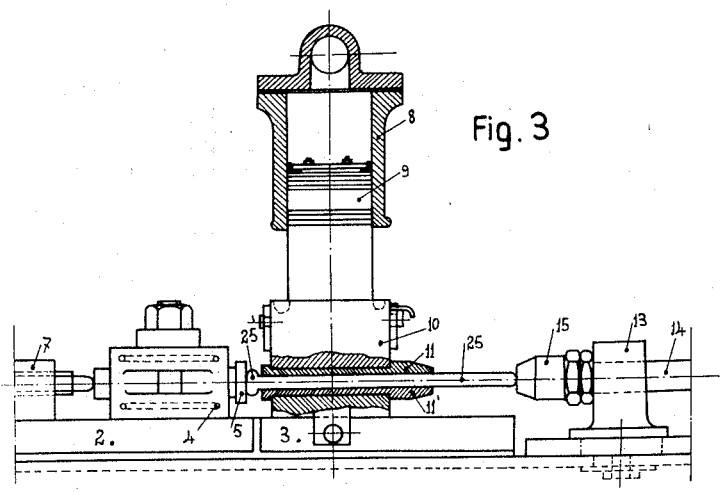
Figure 3 shows a detail to an enlarged scale.

1 denotes a bed on which are mounted two electrically insulated plates 2 and 3 connected to the terminals of a transformer or other source of electricity of suitable voltage. On the plate 2 is mounted a water-cooled block 4 fast with a piece 5 serving as an anvil for the piece to be upset and adjustable by means of a set screw 6 mounted on a support 7. On the plate 3 is mounted a hydraulic cylinder 8, the piston 9 of which is fast with a block 10 and is held in a lifted position by a lever mechanism 23 with a return spring 24. The block 10 carries an interchangeable half-bush 11 lying above a second half-bush 11' mounted in a block 12 secured on plate 3.

The blocks 10 and 12 are water-cooled.

On the bed 1 is further adjustably mounted a support 13 in which is movable a spindle 14 provided at one end with an adjustable head 15 and connected at its other end to a piston rod 16 of a hydraulic cylinder 18 somewhat larger than cylinder 8. To the piston rod 16 is also secured a stirrup 17 movable on a guide rod 19 and kept in its backward position of rest by a spring 20.

The cylinders 8 and 18 are fed through the delivery conduit 21 of a pump and are provided with an outlet valve or tap 22 which is open in the position of rest, so that no pressure is generated inside the cylinders. The tap is provided with an operating handle 27.

The upsetting or jolting machine works as follows:

The work piece e. g. a bar 25 for making an automobile valve is placed into the bush 11' between the anvil 5 and head 15 whereafter I close the tap 22. The pressure rises in the cylinders 8 and 18 and the piston 9 pushes the block 10 and bush 11 downwards clamping the bar 25; at the same time the spindle 14 advances under the action of the piston rod 16 and efficiently presses the bar against the anvil 5. By feeding current to plates 2 and 3 through a switch 28, the bar portion between the bush 11—11' and the anvil 5 is heated and softens until its resistance is lower than the pressure of spindle 14. Upsetting then commences and a head 25' is formed that increases in size as long as the spindle presses the bar, this ceasing when the projection 14' of the spindle rests against the support 13.

The length of stroke is conveniently adjusted in order to form at the end of the bar a head of the exactly required size for obtaining therefrom the valve cone by a simple stamping operation.

I thus upset the work piece with the smallest waste of material and the valve after stamping requires no further treatment except boring the seat and spindle. Upsetting cannot exceed the predetermined limit as the spindle stops when the projection 14' reaches the support 13, whereupon the excess pressure is discharged through an automatic valve of the pump.

When a hydraulic accumulator is available it may be utilized for feeding the cylinders. These latter are then provided with inlet valves or cocks arranged to open when tap 22 closes and vice versa.

Any suitable liquid or fluid e. g. air or other gas can be used in lieu of water for the transmission of pressure.

Besides the valve mentioned by way of example the upsetting machine can be used for the production of an endless number of articles.

What I claim is:

An upsetting or jolting machine comprising a bed, two insulated plates mounted on said bed and connected to the terminals of a source of electricity, a ram mounted on one of said plates and the piston whereof actuates a half-bush cooperating with another half-bush for gripping the work piece, an adjustable anvil arranged on the other plate, a guide and stop support situated on the bed, a plunger axially slidable in said support, a piston connected to the piston of a second ram and adjustable means for regulating the stroke of said piston.

In testimony that I claim the foregoing as my invention I have signed my name.

FRANCESCO BRERO.